United States Patent [19]

Lambert et al.

[11] 4,437,182
[45] Mar. 13, 1984

[54] METHOD AND APPARATUS FOR INTERLEAVING CONTROL SIGNALS

[75] Inventors: David A. Lambert, New Fairfield; Gary A. Profet, Watertown, both of Conn.

[73] Assignee: General DataComm Industries, Inc., Danbury, Conn.

[21] Appl. No.: 224,337

[22] Filed: Jan. 12, 1981

[51] Int. Cl.³ .............................................. H04J 3/12
[52] U.S. Cl. ................................... 370/110.1; 370/95; 370/80
[58] Field of Search ................. 370/110.1, 95, 96, 44, 370/111, 79, 80

[56] References Cited

U.S. PATENT DOCUMENTS

| | | | |
|---|---|---|---|
| 3,588,364 | 6/1971 | Wallingford et al. | 370/79 |
| 3,959,594 | 5/1976 | Srivastava | 370/95 |
| 3,961,140 | 6/1976 | Carbrey | 370/95 |
| 4,059,731 | 11/1977 | Green et al. | 370/110.1 |

Primary Examiner—Marshall M. Curtis
Attorney, Agent, or Firm—Pennie & Edmonds

[57] ABSTRACT

A method and apparatus are described for ensuring that control signals from every data channel are transmitted periodically regardless of any change in these control signals. The apparatus comprises a counter for counting the number of control signals transmitted, decision logic for determining when it is time to transmit a set of control signals regardless of any change in these signals and circuitry for selecting the channel whose signals are to be transmitted. The apparatus provides additional equipment for determining when the control signals for a particular channel have changed and for transmitting such signals with suitable error checking. The apparatus also provides equipment for interleaving the two flows of control signals without loss of the control signals which are changed.

20 Claims, 8 Drawing Figures

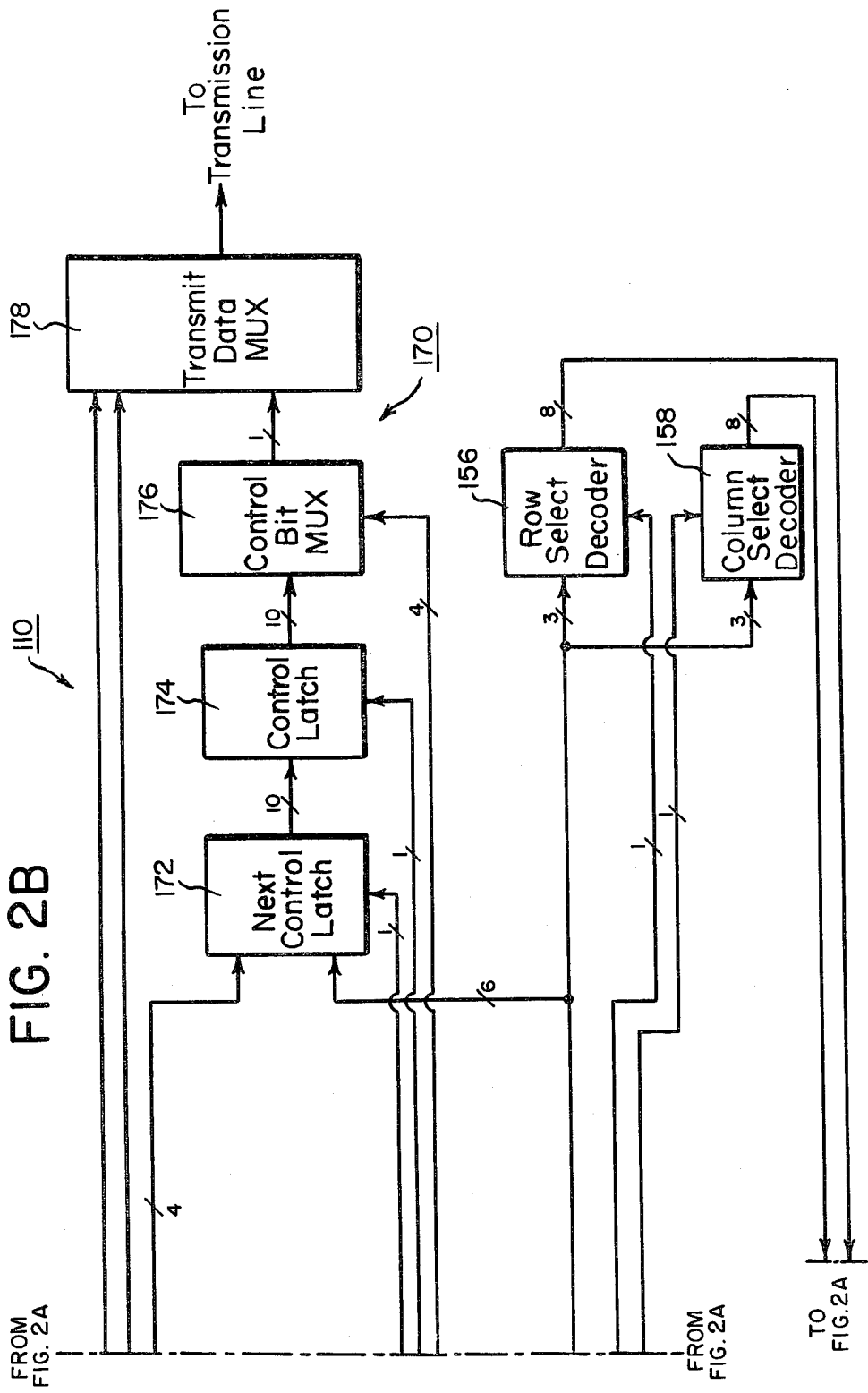

METHOD AND APPARATUS FOR INTERLEAVING CONTROL SIGNALS

CROSS REFERENCES TO RELATED APPLICATIONS

This application is related to the following concurrently filed applications: "Automatic Framing in Time Division Multiplexer", Ser. No. 224,339; "Method and Apparatus for Establishing Frame Synchronization", Ser. No. 224,338; "Method and Apparatus for Overhead Signaling", Ser. No. 224,335; and "Method and Apparatus for Distributing Control Signals", Ser. No. 224,340. Each of these appllications is assigned to General DataComm Industries, Inc. and is incorporated herein by reference.

TECHNICAL FIELD

This relates to a method and apparatus for operating a time division multiplexer (TDM) system and, in particular, a method and apparatus for control signaling in such a system.

BACKGROUND ART

In a typical TDM system, a transmitter samples pulse signals of relatively low pulse repetition frequency from various data sources or channels and interleaves them with one another to form an aggregate data stream that is transmitted by a high speed aggregate channel to a remote receiver. Ordinarily, the TDM transmitter inserts the signals representative of a single bit or a single character in a single time slot in the aggregate data stream and interleaves the signals from different channels on a bit-by-bit or character-by-character basis so that adjacent time slots contain signals from different channels. However, different size blocks of signals can be used if desired. At the receiver, the individual bits or characters are separated from one another and allocated to various low frequency data channels similar to those at the transmitter.

To permit proper decoding of the data stream at the receiver, the transmitter interleaves the signals from the various data channels in accordance with a fixed schedule which it repeats endlessly and the receiver uses the same schedule to decode the data stream. Each cycle of the schedule is called a frame or an aggregate frame. In addition to data signals, each frame ordinarily includes synchronization signals called frame sync words and various control signals, both for individual channels and for the entire TDM system. Typically, the synchronization and control signals take up a small portion (less than 5%) of the total frame which is referred to as the overhead. To simplify the generation of the signals used to select the particular data channel from which a bit or character is to be transmitted, it is customary to sample the data channels in a fixed pattern which is repeated numerous times within each frame. Each such cycle of repetition is called a subframe.

While the synchronization and control signals take up a relatively small portion of the aggregate frame, transmission of these signals causes numerous problems in the efficient operation of the TDM. One such problem is the competition between the need to transmit promptly changes in the control signals for a channel and the need to ensure that each channel's control signals are transmitted periodically so that the system may recover if there is a communication failure. The protocol used in many TDMs is to transmit a change in the control signals for a channel in the next available time slot after a change has occurred. If a time slot becomes available for transmission and there are no changes to be transmitted, a counter is incremented and the incremented value is used to select a channel whose control signals are transmitted. This, however, can lead to serious problems if one or more channels have enough control activity to occupy all of the available time slots because the TDM will never transmit the controls for the remaining channels. As a result, if there is a failure in communications, it may be difficult, if not impossible, to reestablish communications automatically.

SUMMARY OF THE INVENTION

In accordance with the invention, a method and apparatus have been devised to ensure that control signals from every data channel are transmitted periodically regardless of any change in these control signals. Apparatus is provided for counting the control signals that are transmitted. At a fixed interval, such as once in every eight control signal transmissions, the apparatus defers the transmission of a new set of control signals in favor of a set of control signals selected systematically from the available data channels.

The apparatus comprises a counter for counting the number of control signals transmitted, decision logic for determining when it is time to transmit a set of control signals regardless of any change in the control signals, and circuitry for selecting the channel whose signals are to be transmitted. Further, the apparatus provides equipment for determining when the control signals for a particular channel have changed and for transmitting such signals with suitable error checking. Finally, the apparatus provides means for interleaving the two flows of control signals without loss of the control signals which have changed.

BRIEF DESCRIPTION OF THE DRAWINGS

These and other objects, features, elements and advantages of the invention will be more readily apparent from the following detailed description of the drawings in which.

BEST MODE FOR CARRYING OUT THE INVENTION

Figure 1:
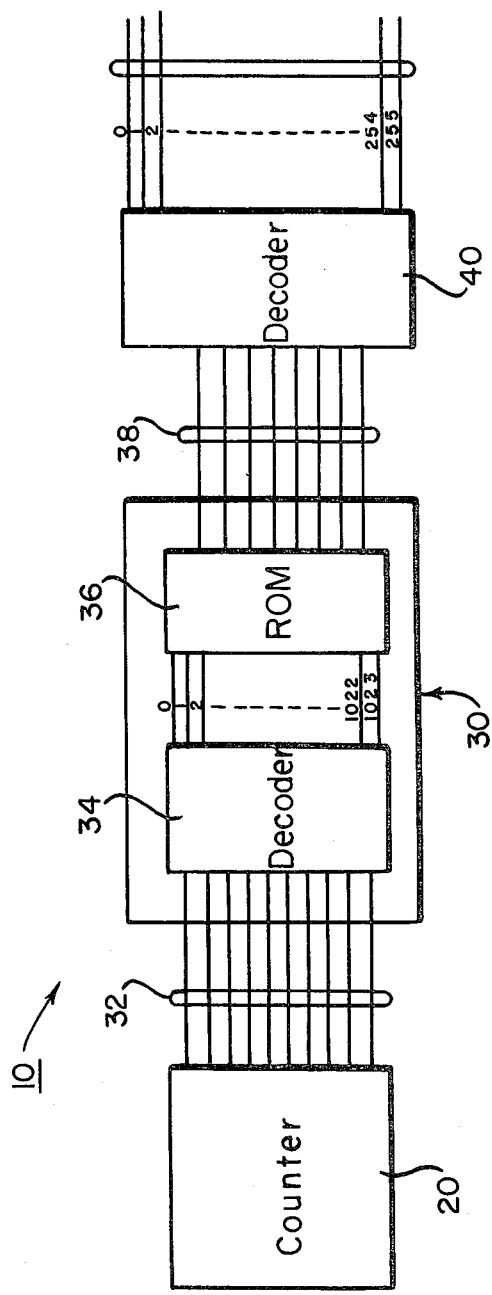
FIG. 1 is a block diagram depicting an illustrative embodiment of a frame generator of the prior art which may be used in the practice of my invention.
Figure 2A:
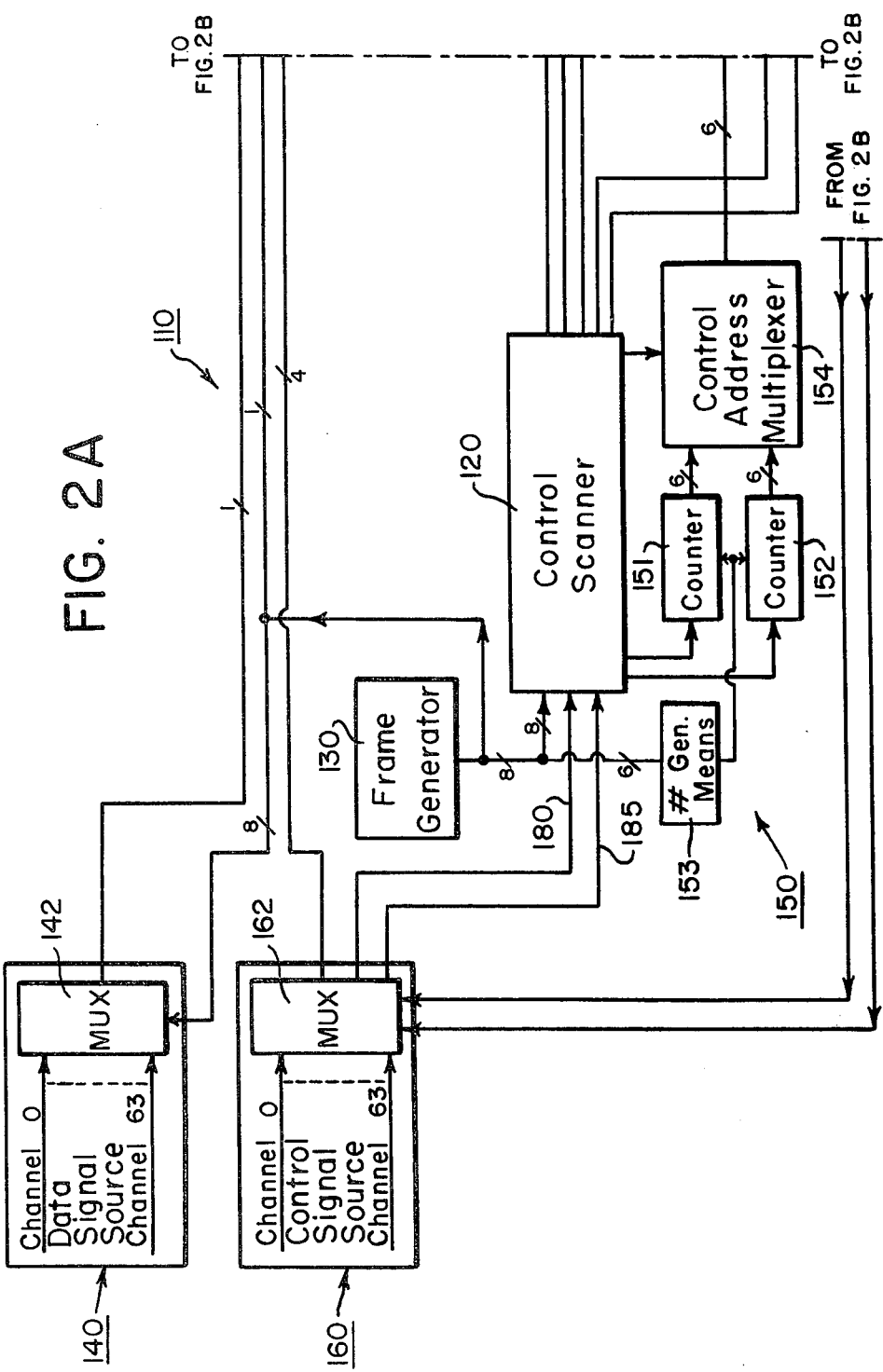
FIG. 2, consisting of FIGS. 2A and 2B is a block diagram of an illustrative embodiment of portion of a TDM transmitter modified in accordance with the invention.
Figure 3:
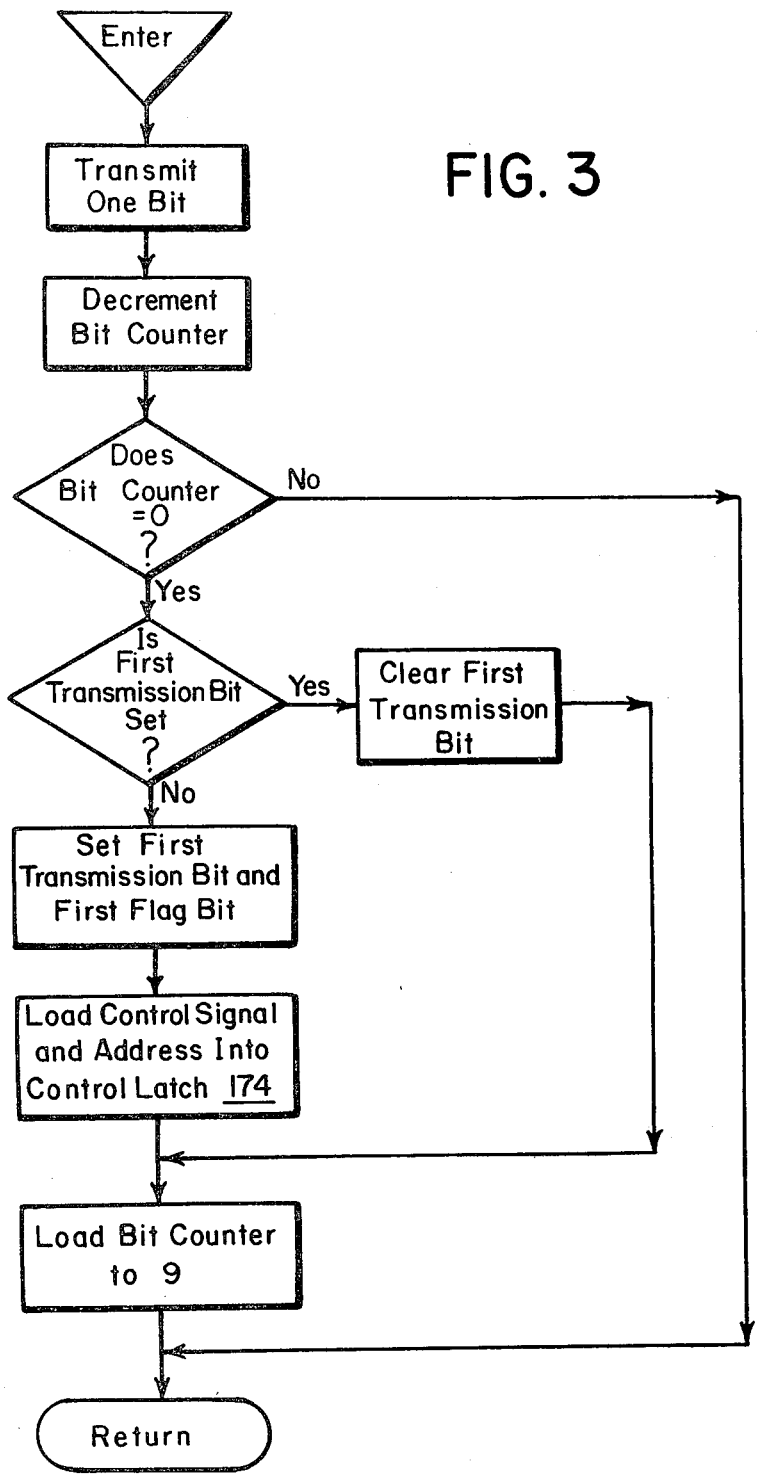
FIG. 3 is a flow chart useful in understanding the operation of a first portion of the apparatus of FIG. 2.

Simplified block diagrams of an illustrative TDM system, a TDM transmitter and a TDM receiver are set forth in FIGS. 1, 2 and 3 respectively, of U.S. Pat. No. 3,632,882 for "Synchronous Programmable Mixed Format Time Division Multiplexer," which is incorporated herein by reference. As shown therein, a plurality of pulse data sources or channels A-X are connected by transmitter multiplexer 100 in time-division multiplex format via a conventional transmission system 101 to a receiver demultiplexer 102 where the interleaved data signals are separated and delivered to appropriate data sinks A-X. Since the pulse repetition rate and the number of bits per character may differ from one source to the next, the data from each source is advantageously stored in a separate buffer register prior to transmission. Data stored in each such register is shifted out by a channel shift clock signal that is applied to the register under control of a channel select signal; and the data signals from the registers are combined by OR gate 210 to produce a composite data signal. Thus the channel select signals determine the particular time slots in the composite data signal which are occupied by data from each channel. In similar fashion at the demultiplexer, channel select signals are supplied to AND gates 330A-300X and to AND gates 301A-301X to select the particular channel into which the shift clock signal shifts the data located at a particular time slot in the composite data signal. As will be appreciated, each station in a TDM system usually comprises both a transmitter and a receiver for two way communication between the stations of the system.

Appropriate channel select signals for the transmitter and the receiver may be generated in many ways. For example, the channel select signals may be stored in a programmable read only memory and the signals may be read out by accessing the individual addresses of the memory serially using a binary counter. This, as shown in FIG. 1, a frame generator 10 might comprise a recycling binary counter 20, a memory 30 and a decoder 40. The memory might be a 1KX8 bit memory with ten parallel input lines 32, a 10-line-to-1024 line decoder 34, a read only memory matrix 36 having 1,024 address lines to memory locations which are addressed one at a time and eight parallel binary output lines 38. When the memory is enabled, the signal on the ten input lines is decoded to activate a single address line to the memory matrix. This produces a binary output signal on the eight output lines in accordance with the information stored at the address in the memory matrix. These output lines are then applied to decoder 40 which converts a parallel binary signal on its eight input lines to an output on one of as many as 256 output lines. Of these output lines, some are channel select lines which are used to enable channel select gates in a multiplexer. Such gates are shown as elements 200A-200Z and 201A-201Z in the transmitter multiplexer 100 depicted in FIG. 2 of the U.S. Pat. No. 3,632,882 and elements 300A-300X and 301A-301X in receiver multiplexer 102 of FIG. 3 of that patent. Other output lines are available to enable gates for control and synchronization signaling.

Each data channel uses a set of control signals for signaling between the customer's terminals at either end of the channel. These control signals typically are one or more of the standard EIA signals including request to send, clear to send, data set ready, data terminal ready and the like.

As indicated above a conflict exists in the allocation of time slots for control signalling. On the one hand, it is necessary to transmit promptly any change in the control signals for a channel; and on the other hand, it is necessary to ensure the each channel's control signals are transmitted periodically so that it is possible to resume communications after a communication failure. For convenience, the first type of control signaling will be referred to hereinafter as update signaling and the second type as polled signaling. In accordance with the present invention, these conflicts are resolved by ensuring that a percentage of the control signaling is devoted to polled signaling.

Illustrative TDM apparatus 110 for controlling the transmission of control signals in accordance with the invention is depicted in block diagram form in FIG. 2. As will be apparent, this apparatus interleaves the signals from the different data channels on a bit-by-bit basis. Apparatus 110 comprises a control scanner 120, a frame generator 130, a data signal source 140, an addressing means 150, a control signal source 160, a transmission means 170, a first signal bus 180 and a second signal bus 185. The capacity of the apparatus of FIG. 2 is large enough to accommodate up to 64 separate data channels; and the modification of the apparatus to accommodate other numbers of channels will be obvious. To avoid unnecessary detail, FIG. 2 does not depict numerous elements of a TDM transmitter which are not part of this invention. For convenience the number of lines in the connection between blocks is represented schematically by the number followed by a slash mark.

The invention may be practiced with any type of frame generator 130 which produces a multiplicity of output signals, some of which are used to select data channels for transmission and others of which are used to initiate control and/or synchronization signaling. Illustratively, frame generator 130 is similar to that of FIG. 1. Specific details of a frame generator which preferably is used with the invention are set forth in the above referenced application "Automatic Framing in Time Division Multiplexer". By way of example, a portion of the contents of the memory of frame generator 130 is set forth in Table 1.

TABLE 1

| Memory Location | \multicolumn{7}{c}{Output Line} | Function |
| --- | --- | --- | --- | --- | --- | --- | --- | --- |
| | 7 | 6 | 5 | 4 | 3 | 2 | 1 | 0 | |
| 395 | 0 | 0 | 0 | 0 | 0 | 0 | 0 | 1 | CH1 Select |
| 396 | 1 | 1 | 0 | 0 | 0 | 0 | 1 | 1 | CONTROL |
| 397 | 0 | 0 | 0 | 0 | 0 | 0 | 0 | 1 | CH1 Select |
| 398 | 0 | 0 | 0 | 0 | 0 | 0 | 1 | 0 | CH2 Select |
| 399 | 0 | 0 | 0 | 0 | 0 | 0 | 1 | 1 | CH3 Select |
| 400 | 0 | 0 | 0 | 0 | 0 | 0 | 0 | 0 | CH4 Select |
| 401 | 1 | 1 | 0 | 0 | 0 | 0 | 1 | 1 | CONTROL |
| 402 | 0 | 0 | 0 | 0 | 0 | 0 | 0 | 1 | CH1 Select |
| 403 | 0 | 0 | 0 | 0 | 0 | 0 | 0 | 1 | CH5 Select |
| 404 | 0 | 0 | 0 | 0 | 0 | 0 | 0 | 1 | CH7 Select |
| 405 | 0 | 0 | 0 | 0 | 0 | 0 | 0 | 1 | CH9 Select |
| 406 | 1 | 1 | 0 | 0 | 0 | 0 | 1 | 1 | CONTROL |
| 407 | 0 | 0 | 1 | 1 | 0 | 0 | 1 | 0 | CH62 Select |
| 408 | 0 | 0 | 1 | 1 | 0 | 0 | 1 | 1 | CH63 Select |

As shown in FIG. 2, the eight output lines of frame generator 130 are coupled to control scanner 120, and to data signal source 140. Six of the lines from generator 130 are connected to means 153 for determining the largest channel number. One of the lines from frame generator 130 is also connected to a transmit data multiplexer 178 in transmission means 170.

Data signal source 140 comprises the 64 individual channels that are served by the TDM and a multiplexer 142 which selects for transmission one bit of the data present on one channel in accordance with the channel select signal supplied from frame generator 130. Further details of an illustrative multiplexer 142 are disclosed in U.S. Pat. No. 3,632,882. As will be apparent, to control channel select gates 220A–200Z and 201A–201Z of the multiplexer of the '882 patent, it will be necessary to decode the address signals supplied from frame generator 130 of the present invention.

Addressing means 150 is used to address individually each one of the 64 channels which may be connected to the TDM. It comprises first and second counters 151, 152, means 153 for generating the largest channel number, a control address multiplexer 154, a row select decoder 156 and a column select decoder 158. Generating means 153 comprises latches and a comparator which read the channel select signals from frame generator 130 and determine the number of the highest channel. This number is loaded into counters 151, 152 at the beginning of each cycle of the counter. Under the control of control scanner 120, multiplexer 154 uses the count on either counter 151 or counter 152 to address decoders 156, 158. Since six binary address lines are needed to address the 64 data channels, counters 151 and 152 each have a capacity of 64 and have six output lines by which their instantaneous count is transferred to control address multiplexer 154. As indicated in FIG. 2, three of these output lines are used to address decoder 156 and the other three are used to address decoder 158. Each decoder is a 1-of-8 decoder which produces an output signal on one of eight lines in accordance with the binary signal presented in parallel on its three input lines. Illustratively, the eight output lines from decoder 156 are row select lines and those from decoder 158 are column select lines. Counters 151, 152 may be implemented with pairs of 169-type synchronous counters; and multiplexer 154 may be a pair of 157-type quad 2-input multiplexers. Generating means 153 may use 377-type octal D flip-flops and a pair of 85-type 4 bit comparators. Decoders 156, 158 may be 138-type 1-of-8 decoders.

Control signal source 160 comprises the individual channels that are multiplexed by the TDM and a multiplexer 162 which selects for transmission the control signals present on one channel in accordance with the address supplied on the row select and column select address lines from decoders 146, 148. Again the multiplexer may be similar to that described in U.S. Pat. No. 3,632,882. As shown in FIG. 2, four control signal lines are used in the preferred embodiment of the invention, permitting the use of up to 16 binary coded control signals or as many as four uncoded signals.

Transmission means 170 comprises a next control latch 172, a control latch 174, a control bit multiplexer 176 and transmit data multiplexer 178. When a channel is selected for data transmission, transmit data multiplexer 178 transmits a bit of data supplied from data source 140. When a control signal is to be transmitted, multiplexer 178 transmits one bit of that signal supplied from control bit multiplexer 176. Illustratively, each control signal consists of ten bits, four of which are channel control signals and six of which specify the address of the channel to which the controls pertain. The control signal that is being transmitted is stored in control latch 174 and read one bit at a time by control bit multiplexer 176 in response to CONTROL select signals that are generated by frame generator 130 and used by scanner 120 to control the operation of multiplexer 176. While the signal in control latch 174 is being transmitted, the control bits and associated channel address of the next control signal are loaded into the next control latch 172 under control of scanner 120. Latches 172, 174 may be implemented with pairs of 377-type octal D flip-flops. Multiplexer 176 can be a pair of 251 type 8-input multiplexers and multiplexer 178 can be a 153-type dual 4-line to 1-line multiplexer.

An illustrative flow chart for the operation of transmission means 170 is set forth in FIG. 3. In accordance with this flow chart, each control signal is transmitted twice to protect against transmission errors. A bit counter (not shown in FIG. 2) is used to record the number of bits in the control signal that have been transmitted; and a flag bit which is set before any part of the signal is transmitted is used to determine whether the signal has been transmitted once or twice.

Each time frame generator 130 produces a time slot in which a control signal is to be transmitted, the steps depicted in FIG. 3 are executed immediately under control of hand-wired logic in scanner 120. First, scanner 120 causes multiplexer 176 to read the next control bit stored in latch 174 and to forward that bit to multiplexer 178 for transmission. The bit counter is then decremented by one. Next, the control scanner tests to determine if the contents of the bit counter equals zero. If it does not, there is no further operation to be performed and the scanner waits for the next time slot in which a control signal is to be transmitted. If the bit counter equals zero, the scanner tests to determine if the first transmission bit has been set. If it has, the complete control signal has been transmitted for the first time so the scanner clears the transmission bit; and when the next control signal time slot is produced, it loads the bit counter to nine. If the first transmission bit has not been set, the complete control signal has been transmitted twice and the transmission means is ready to receive a new control signal. Thus, the scanner sets the first transmission bit as well as a first flag bit which indicates that a control signal and address has just been loaded from next control latch 172 into control latch 174. The scanner then performs the loading operation represented by the first flag bit it just set; and finally, when the next control signal time slot is produced, it loads the bit counter to nine.

Figure 4:
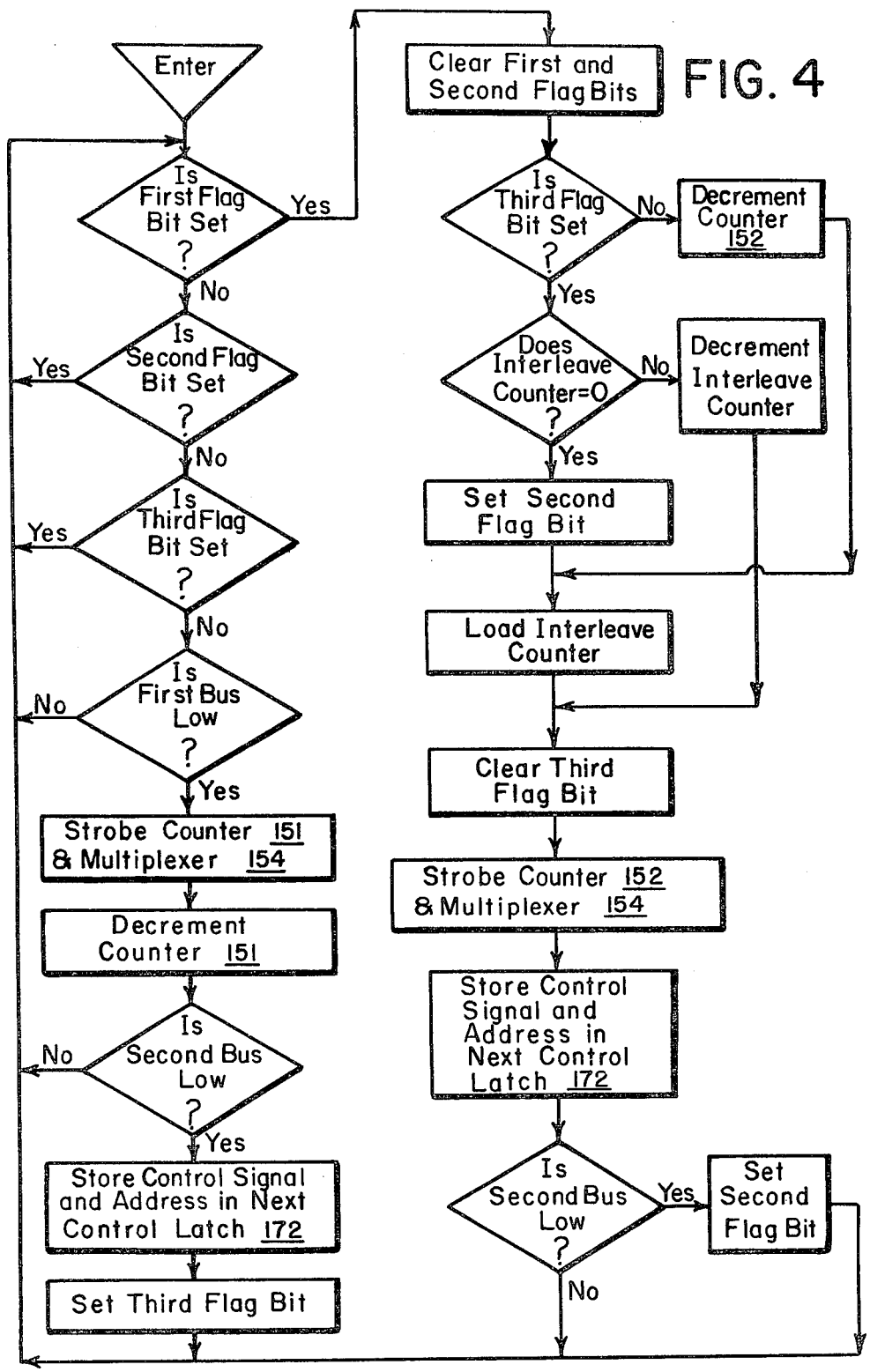
FIG. 4 is a flow chart useful in understanding the operation of a second portion of the apparatus of FIG. 2.

New control signals and addresses are loaded by scanner 120 into next control latch 172 by a second sequence of operations depicted in FIG. 4. The purpose of this procedure is to detect the change in the control signals in any channel, to load the new set of control signals and the address for that channel into next control latch 172 and to ensure that the polled control signals from each channel are transmitted periodically regardless of whether there has been any change in their status.

The left hand side of the flow chart of FIG. 4 details the steps performed by scanner 120 to locate a channel where the control signals have changed and to store the new control signals and their channel address in the next control latch. The right hand side of the flow chart of FIG. 4 details the tests performed by scanner 120 to ensure that each channel's control signals are transmitted periodically. Up to seven updated control signals may be transmitted in a row. The eighth control signal to be transmitted, however, must be sent from a polled channel that is selected regardless of any change in the control signal. Counter 151 is used to address the data channels to access updated control signals; and counter 152 is used to address the data channels to access the polled control signals. A third counter (not shown in FIG. 2) is used to determine when a polled control signal must be interleaved with the updated control signals.

With reference to the left hand side of the flow chart of FIG. 4, a change in a control signal is indicated to control scanner 120 by the fact that the signal on first bus 180 goes low. This signal is, in essence, an interrupt signal such as that commonly used in prior art TDMs to signify that a channel needs servicing. If the first, second and third flag bits are not set, the scanner strobes counter 151 and address multiplexer 154 so that the six bit address then in counter 151 addresses one of the 64 channels serviced by the TDM. This address is retained in multiplexer 154. Scanner 120 then decrements counter 151. If the control signals associated with the channel that is addressed are the control signals that have changed, second bus 185 will go low. The provision of such a recognition signal when the addressed channel is the one which had previously requested an interrupt is conventional in TDM practice. If the second bus does not go low and the flag conditions remain unchanged, the scanner logic will recycle and strobe counter 151 to address the channel specified by the new address in the counter.

This process will continue until the second bus goes low, at which point the scanner stores in next control latch 172 both the address on the output lines from multiplexer 154 and the control signals from the channel that is addressed. Next, the scanner sets a third flag bit to prevent the contents of next control latch 172 from being over-written.

When transmission means 170 completes the transmission of the signal then in control latch 174, it sets the first flag bit and loads the signal in next control latch 172 into control latch 174. As soon as control scanner 120 detects the first flag bit, its operation branches to the right hand side of FIG. 4. In that branch it initially clears the first and second flag bits and disables counter 151. It then tests to determine if the third flag bit is set. If that flag is not set, the signal that was just loaded into control latch 174 was a polled signal and there is no pressing need to transmit another polled signal before seven updated signals are next transmitted. Accordingly, scanner 120 decrements counter 152 by one to access the next polled channel, loads the interleave counter and clears the third flag bit which protects the contents of next control latch 172 from being over-written. It then strobes counter 152 and multiplexer 154 to address the channel whose address is stored in counter 152. The control signals for that channel as well as their address are then loaded into next control latch 172. As a precaution, the scanner tests to determine if second bus 185 has gone low. If it has not, the control signals that were just loaded into the next control latch are polled signals. If, however, the bus has gone low, then the signals loaded in the next control latch are updated control signals; and scanner 120 sets a second flag bit to protect these signals from being over-written. Scanner 120 then returns to the test procedure in accordance with the left hand side of the flow chart of FIG. 4.

If the second flag bit is not set and there is a subsequent change in a channel control signal before transmission means 170 completes transmission of the control signal in control latch 174, scanner 120 will write this new set of updated control signals over the contents of next control latch 172 in accordance with the procedures set forth on the left hand side of FIG. 4. Otherwise, the control signals for the channel addressed by counter 152 will be present in next control latch 172 when transmission means 170 completes transmission of the signal in control latch 174 and transfers the contents of the next control latch 172 to control latch 174.

If the third flag bit is set when the scanner begins to execute the steps shown on the right hand side of FIG. 4, then an updated control signal has just been transferred from next control latch 172 to control latch 174. Accordingly, it is necessary to determine if seven such signals have just been transmitted in a row and to condition the apparatus to transmit a polled signal if this is the case. An interleave counter, which is decremented from seven to zero, counts the number of updated control signals that are transmitted. If the third flag bit is set, control scanner 120 tests the status of the interleave counter. If the counter has not reached zero, it decrements the counter and clears the third flag bit. It then strobes counter 152 and multiplexer 154 to address the channel specified by the counter and it stores the polled control signal and its address in next control latch 172. As in the previously described case where a polled signal had just been transmitted, this signal may be over-written if there is a subsequent change in a channel control signal. However, by testing second bus 185 and setting a second flag bit, the contents of latch 172 are protected where they constitute an updated control signal.

If, however, the interleave counter has reached zero, scanner 120 sets the second flag bit before loading the interleave counter and clears the third flag bit. It then strobes counter 152 and multiplexer 154 to address a polled channel and stores the control signal and it address in next control latch 172. Since in this case the second flag bit is set, these contents cannot be over-written and will be the next control signal transmitted by the TDM. As a result, in at least one case out of eight, a polled control signal is transmitted.

From the foregoing description of the operation of scanner control 120 specific hardware and software implementations of this scanning logic will be apparent to those skilled in the art. An illustrative hard-wired implementation of the above described features of scanner control 120 is set forth in FIGS. 5 and 6.

Figure 5:
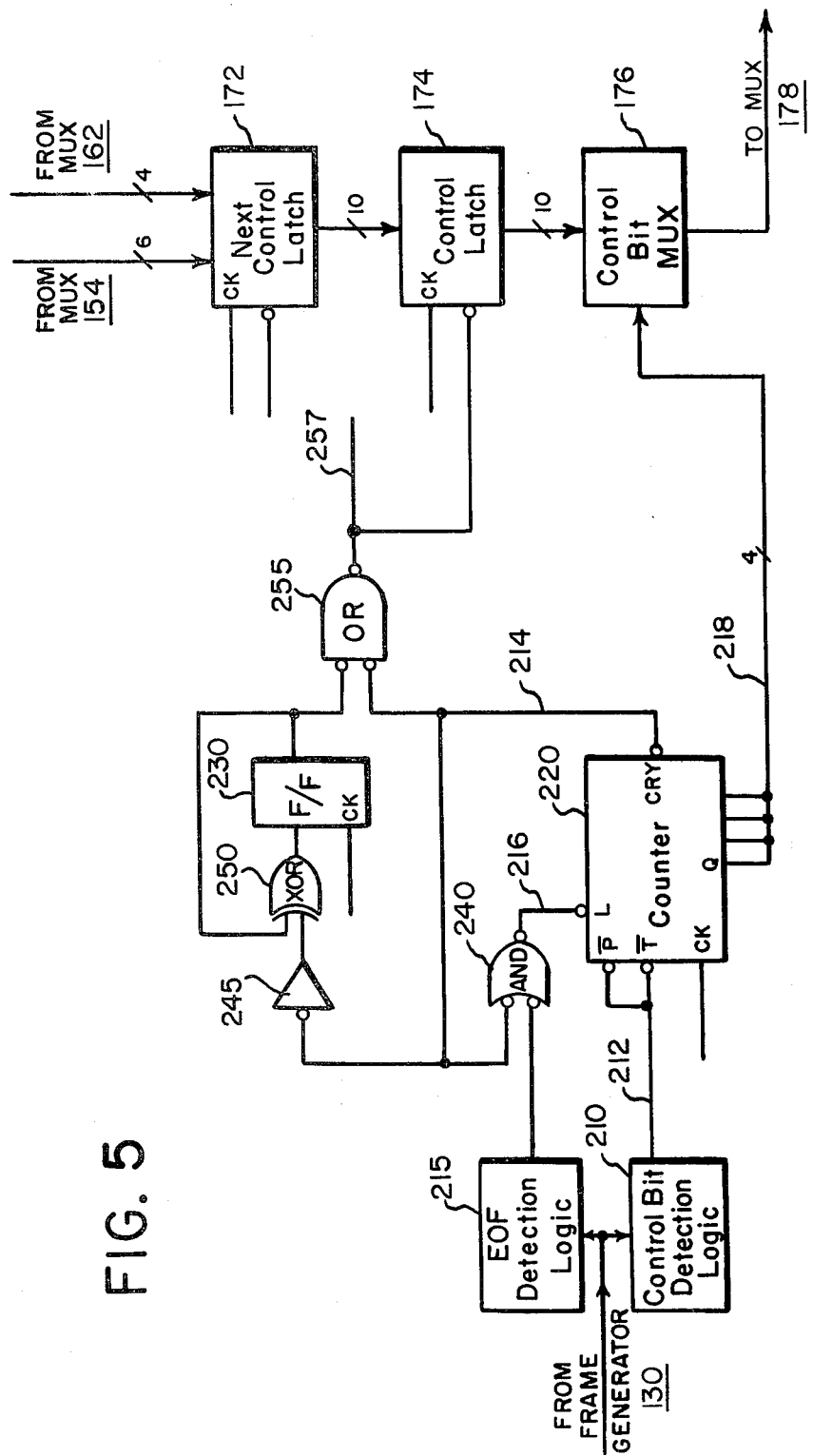
FIGS. 5 and 6 are schematic illustrations of certain details of the apparatus of FIG. 2.

The apparatus of FIG. 5, which is used to execute the flow chart of FIG. 3, comprises a control bit detection logic 210, an end-of-frame (EOF) detection logic 215, a counter 220, a first D-type flip-flop 230, an AND gate 240, an inverter 245, an exclusive OR (XOR) gate 250, and an OR gate 255. It also includes next control latch 172, control latch 174 and control bit multiplexer 176 which are the same devices as depicted in FIG. 2B. In addition, a second D-type flip-flop 260 and an AND gate 265 shown at the bottom of FIG. 6 are used in implementing the flow chart of FIG. 3.

Figure 6:
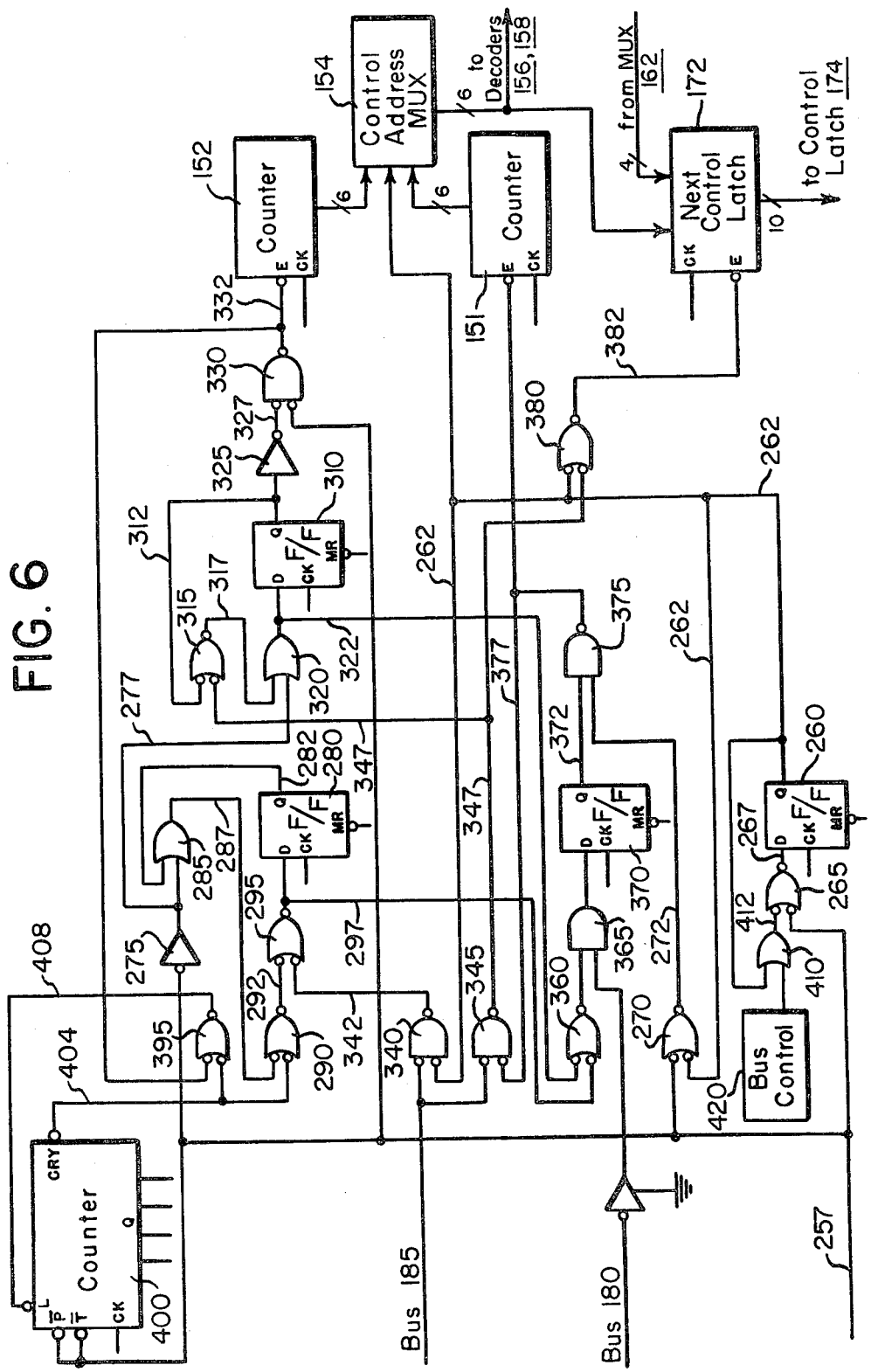

In accordance with standard practice, the bubbles at the inputs or outputs of many of the elements of FIGS. 5 and 6 indicate signal inversion (or negation). Further, to facilitate the understanding of the operation of the circuit, AND gates 240 and 265 and OR gate 255 are drawn as OR gates and AND gates, respectively, which are negated at both their input and output.

Counter 220, flip-flops 230, 260 and latches 172, 174 are all clocked together by a common clock signal. Counter 220 is a conventional 169-type counter having count-enable input terminals $\overline{P}$ and $\overline{T}$, a clock terminal CK, output terminals Q, a carry lookahead terminal CRY, and a load terminal L. The counter is enabled by a low signal on line 212 and is advanced by one for each clock signal received while it is enabled. As will be appreciated by those skilled in the art, whether the count stored in the counter is incremented or decremented is a matter of design choice. In practicing the invention, counter 220 has been decremented from a count of nine. The signal on line 214 from the carry terminal CRY is high except when the counter reaches zero. Output lines 216 from terminals Q strobe control bit multiplexer 176 so as to read out one at a time the ten control bits in control latch 174 in accordance with the count stored in the counter.

Flip-flop 230 stores the first transmission bit. When this bit is set, the output terminal Q of flip-flop 230 is high; otherwise it is low. Flip-flop 260 stores the first flag bit. When this bit is set, the output terminal Q of flip-flop 260 is low; otherwise it is high.

Control bit detection logic 210 and end of frame logic 215 monitor the output of frame generator 130. Whenever the frame generator reaches a time slot allocated to a control bit, it produces a CONTROL select signal such as those shown in Table 1. In the absence of a CONTROL select signal, the output of detection logic 210 on line 212 is high. As a result, the counter operation is disabled and clock signals applied to the CK terminal do not affect the count. When detection logic 210 senses a CONTROL select signal, its output signal goes low, thereby enabling counter 220. As a result, the counter is advanced by one upon receipt of the next clock signal.

If the counter does not reach zero upon being decremented by the clock signal, the signal on line 214 from the carry terminal CRY remains high. As a result, the signal on line 257 from OR gate 255 is high thereby disabling control latch 174. The signal on line 257 is also applied to AND gate 265 shown at the bottom of FIG. 6. When the signal on line 257 is high, AND gate 265 operates so as to apply to input terminal D of flip-flop 260 the signal on line 412. As will be detailed below, the output signal from flip-flop 260 is ordinarily high and the signal on line 412 will ordinarily be high. In these circumstances, there will be no change in the output of flip-flop 260 upon receipt of the next clock signal. As a result, if zero is not reached when the counter is advanced, nothing further happens in the circuitry being discussed; and the circuitry waits for the next CONTROL select signal to be generated by frame generator 130.

If the counter does reach zero, line 214 from carry terminal CRY goes low. If the output of flip-flop 230 is also low signifying that the first transmission bit is not set, line 257 from OR gate 255 goes low. This signal on line 257 enables control latch 174; and the next clock signal received at latch 174 loads the latch with the control signal and address then stored in next control latch 172. When line 257 goes low, a low signal is also applied to AND gate 265 of FIG. 6 causing the input to flip-flop 260 to be low. When the next clock signal is applied to flip-flop 260, the output of flip-flop 260 goes low, thereby setting the first flag bit.

A low signal on line 214 is also inverted by inverter 245 and applied to XOR gate 250. If the output of flip-flop 230 is low (i.e., the transmission bit is not set), the output of XOR gate 250 is high and a high signal is applied to the input of flip-flop 230. When the next clock signal is received, this causes the output of flip-flop 230 to go high. Thus, if the first transmission bit is not set in flip-flop 230, upon receipt of the next clock signal the first transmission bit is set in flip-flop 230, the first flag bit is set in flip-flop 260 and the control signal and its address are loaded from next control latch 172 into control latch 174.

If on the other hand, the first transmission bit is set so that the output of flip-flop 230 is high, the signal on line 257 from OR gate 255 will be high regardless of any change in the signal on line 214 from carry terminal CRY. As a result, no change will take place in the signal applied to control latch 174 or flip-flop 260. However, when the signal on line 214 from terminal CRY goes low, both input terminals to XOR gate 250 will be high, causing the signal applied to the input to flip-flop 230 to go low. When the next clock signal is received by flip-flop 230, this causes the output of flip-flop 230 to go low, thereby clearing the first transmission bit.

Finally, line 214 is also applied to AND gate 240. When the signal on this line goes low, a low signal is produced on an input lead 216 to load terminal L of counter 210. This signal reloads the counter to its initial value of nine upon receipt of the next clock signal. Counter 220 is also reloaded in the same fashion when EOF detection logic 215 detects an end of frame (EOF) signal in the signals produced by frame generator 130.

Illustrative apparatus for executing the flow chart of FIG. 4 is shown in FIG. 6. This apparatus comprises flip-flop 260, which has been described above, D-type flip-flops 280, 310 and 370, a counter 400 and extensive amounts of control logic for controlling the signals stored in the flip-flops, the resetting of the flip-flops and the generation of output control signals to the transmitter. Also shown in FIG. 6 are first and second counters 151, 152, multiplexer 154 and next control latch 172 which are the same as the devices of the same number shown in FIGS. 2A and 2B. As indicated above, flip-flop 260 stores the first flag bit. When this bit is set, the output terminal Q of flip-flop 260 is low; otherwise it is high. Flip-flop 280 stores the second flag bit and flip-flop 310 stores the third flag bit. When either of these bits is set, the output terminal Q of the flip-flop is low; otherwise it is high. Flip-flop 370 records the fact that first data bus 180 is low while the second and third flag bits are not set. When this condition is met, the output terminal Q of flip-flop 370 is high; otherwise it is low. Counter 400 is the interleave counter which is used to ensure that one out of every eight control signals transmitted is obtained from a polled channel regardless of any change in the control signal. Counter 400 is a conventional 169-type counter, the same as counter 220 of FIG. 5, having count-enable input terminals $\overline{P}$ and $\overline{T}$, a clock terminal CK, output terminals Q, a carry terminal CRY and a load terminal L. In practicing the invention, counter 400 is decremented from a count of seven. Counters 151, 152 and 400, latch 172 and flip-flops 260, 280, 310 and 370 are all clocked together by the same clock signal that is used to control the operation of the counter, flip-flops and latches depicted in FIG. 5.

The circuit of FIG. 6 is operated in step with that of FIG. 5 by means of the signal on line 257 from OR gate 255. This signal is normally high, a signal which disables interleave counter 400 while enabling AND gates 265 and 270. The high signal on line 257 is also applied through OR gate 330 to line 332 which is connected to the enable terminal of counter 152. When the signal on line 257 is high, counter 152 is disabled. The signal on line 257 is also inverted by inverter 275 and applied by line 277 to OR gates 285 and 320 in the control logic for flip-flops 280 and 310, respectively.

Bus 185 is high except when the output signals from multiplexer 154 address a data channel whose control signals have changed. Hence the signals on lines 342 and 347 from OR gates 340 and 345 are ordinarily high, thereby enabling AND gates 295, 315 and 380.

When the first flag bit is not set in flip-flop 260, the apparatus of FIG. 6 will execute the procedure shown on the left-hand side of FIG. 4. When this bit is not set, the signal on line 262 from the ouput of flip-flop 260 is high. As a result, both inputs to AND gate 270 are high and the signal on line 272 from AND gate 270 to NAND gate 375 is high. The signal on line 262 is also applied to multiplexer 154. When this signal is high, the output of multiplexer 154 is the contents of counter 151; and when this signal is low, the output of multiplexer 154 is the contents of counter 152. These contents are decoded by decoders 156, 158 to address individual data channels. Since AND gate 380 is normally enabled by the signal on line 347, a high signal on line 262 also produces a high signal on line 382 from AND gate 380 which disables latch 172.

When the second flag bit is not set and the signal on line 282 from the output of flip-flop 280 is therefore high, the signal on line 287 from the output of OR gate 285 will also be high. While the signal on line 257 is high, the feed forward function of counter 400 is disabled; and the signal on line 404 is therefore high, causing the output of AND gate 290 to be high. The signal on line 342 from OR gate 340 is high since one input to this gate is the high signal on line 262 and the other is the signal on second bus 185. Thus both inputs to AND gate 295 are high and the output therefrom on line 297 is likewise high. As a result, the input to flip-flop 280 is the same as its output and the flip-flop will not change states when it is clocked. The signal on line 297 is also applied to AND gate 360 and enables this gate when the signal is high.

If the third flag bit is not set in flip-flop 310, the signal on output line 312 will be high, thereby enabling AND gate 315. The other input to AND gate 315 is line 347 which ordinarily is high because bus 185 is high. As a result, the signal on line 317 from AND gate 315 will be high, the signal on line 322 from OR gate 320 will likewise be high, the input to flip-flop 310 will be high, and the flip-flop will not change states when it is clocked.

Further, a high signal on line 322 will also be applied to AND gate 360 with the result that the signal on line 362 from AND gate 360 will be high when both the second and third flag bits are not set. This signal enables AND gate 365 so that when first bus 180 goes low a high signal is applied to the input of flip-flop 370 causing the output of the flip-flop to go high upon receipt of the next clock signal. Since the signal on line 272 from AND gate 270 is also high, this causes the signal on line 377 from the output of NAND gate 375 to go low.

Line 377 is applied to the enable terminal of counter 151. When the signal on line 377 goes low, the counter is enabled; and while it is enabled, it is decremented by one for each successive clock signal. As a result, when the signal on line 257 is high, as it normally is, and the first, second and third flag bits are not set and first bus 180 is low, multiplexer 154 uses the contents of counter 151 to address the channel address decoders 156, 158. Moreover, counter 151 is decremented by one with each successive clock signal.

When the count in counter 151 finally reaches the address of the channel which caused bus 180 to go low, second bus 185 goes low. As a result, both input signals to OR gate 345 are now low causing the signal on line 347 to go low. This causes the signal on line 382 from AND gate 380 to go low, thereby enabling latch 172; and upon receipt of the next clock signal, the latch stores the channel address then available from multiplexer 154, as well as the control signals from that channel.

When the signal on line 347 goes low, it also disables AND gate 315 causing the output of this gate to go low. Since the signal on line 277 is also low, the output on line 322 from gate 320 goes low causing the input of flip-flop 310 to be low. Thus, in addition to storing the control signal and address in latch 172, the next clock signal also sets the third flag bit in latch 310.

Once the output of latch 310 goes low, AND gate 315 is disabled by the output signal so that the signal applied to the input to flip-flop 310 will remain low as long as the signal on line 257 is high. The low signal on line 322 is also applied to AND gate 360 to disable this gate and thereby disable AND gate 365 as well. This causes the input to flip-flop 370 to go low; and upon receipt of the next clock signal, the signal on line 372 from flip-flop 370 goes low, thereby disabling NAND gate 375. When NAND gate 375 is disabled, the signal on line 377 goes high disabling counter 151. In addition, the high signal on line 377 is applied to OR gate 345 causing the signal on line 347 to go high once more. Since both inputs to AND gate 380 are now high, the signal on line 382 goes high thereby disabling the enable terminal of latch 172.

When the signal on line 257 goes low, the circuit executes the procedure illustrated in the right hand side of the flow chart of FIG. 4. The low signal on line 257 constitutes the first flag bit. It causes the signal on line 267 from AND gate 265 to flip-flop 260 to go low; and the first flag bit is set in flip-flop 260 upon receipt of the next clock signal.

The low signal on line 257 is also applied to inverter 275, thereby producing a high signal on line 277 and on line 287. If line 404 is high, the output of AND gate 290 is also high. Since bus 185 is ordinarily high, the signal on line 342 from OR gate 340 is likewise high and the signal applied on line 297 to the input of flip-flop 280 is high. Upon receipt of the next clock signal, the output of flip-flop 280 will therefore go high, clearing any second flag bit.

The high signal on line 277 is also applied through OR gate 320 to the input to flip-flop 310. Upon receipt of the next clock signal, the output of flip-flop 310 will also go high, clearing any third flag bit.

Before the clock signal is received, however, the output of flip-flop 310 is tested by OR gate 330 for the presence of the third flag bit. If the third flag bit is not set, the output of flip-flop 310 is high, causing the signal on line 327 from inverter 325 to be low. As a result, when the signal on line 257 is also low, the signal on line 332 is low. This signal enables counter 152; and upon receipt of the next clock signal, counter 152 is decremented by one.

When the signal on line 332 goes low, it also disables AND gate 395 thereby causing the signal on line 408 to go low. This signal is inverted at the load terminal L of counter 400 causing the counter to be reloaded upon receipt of the next clock signal.

When the same clock signal is received at flip-flop 260, the signal on output line 262 goes low, causing the output of multiplexer 154 to be the newly decremented count stored in counter 152. At the same time, the low signal on line 262 disables AND gate 380, thereby producing a low signal on line 382. This signal enables the latch so as to store in latch 172 the control signals from the polled channel addressed by counter 152.

Since the signal on line 257 is controlled by the carry terminal of counter 210 of FIG. 5, line 257 will remain low only for the duration of one time slot. As a result, before counter 152 can be decremented more than once, the signal on line 257 will go high, causing the signal on line 332 to counter 152 to go high thereby disabling the counter. Moreover, the first flag bit will ordinarily be cleared on the first clock cycle after it is set. The signal on line 262 from flip-flop 260 is fed back to an OR gate 410, the output of which is applied to AND gate 265. The other input to OR gate 410 is from bus control 420 which serves to multiplex the use of certain signal buses between the transmit and receive sides of the multiplexer system. When the buses are available, the output of control 420 is high causing the signal on line 412 from OR gate 410 to be high. Therefore, as soon as the signal on line 257 goes high, the signal on line 267 from AND gate 265 goes high; and upon receipt of the next clock signal, flip-flop 260 will again change state thereby clearing the first flag bit.

If, on the other hand, the third flag bit is set when the signal on line 257 goes low, the signal on line 327 is high, causing the signal on line 332 to be high. As a result, counter 152 is disabled. If counter 400 has reached zero and the signal on line 404 is low, AND gates 290 and 395 are disabled and the signals on lines 292 and 408 are low. The low signal on line 408 enables the load terminal L of counter 400 so that the counter is reloaded upon receipt of the next clock signal. The signal on line 292 causes line 297 to be low and the clock signal which reloads counter 400 also causes the second flag bit to be set in flip-flop 280. As indicated above, this same clock signal clears the third flag bit, decrements counter 152, and stores in next control latch 172 the control signal and the address specified by counter 152.

It is possible that the channel addressed by counter 152 is one whose control signals had just changed. If this is the case, the signal on second bus 185 will go low when the channel is addressed. If this happens, the signal on line 342 goes low causing the signal on line 297 to be low. As a result, upon receipt of the next clock signal, the second flag bit will be set at flip-flop 280.

Figure 7:
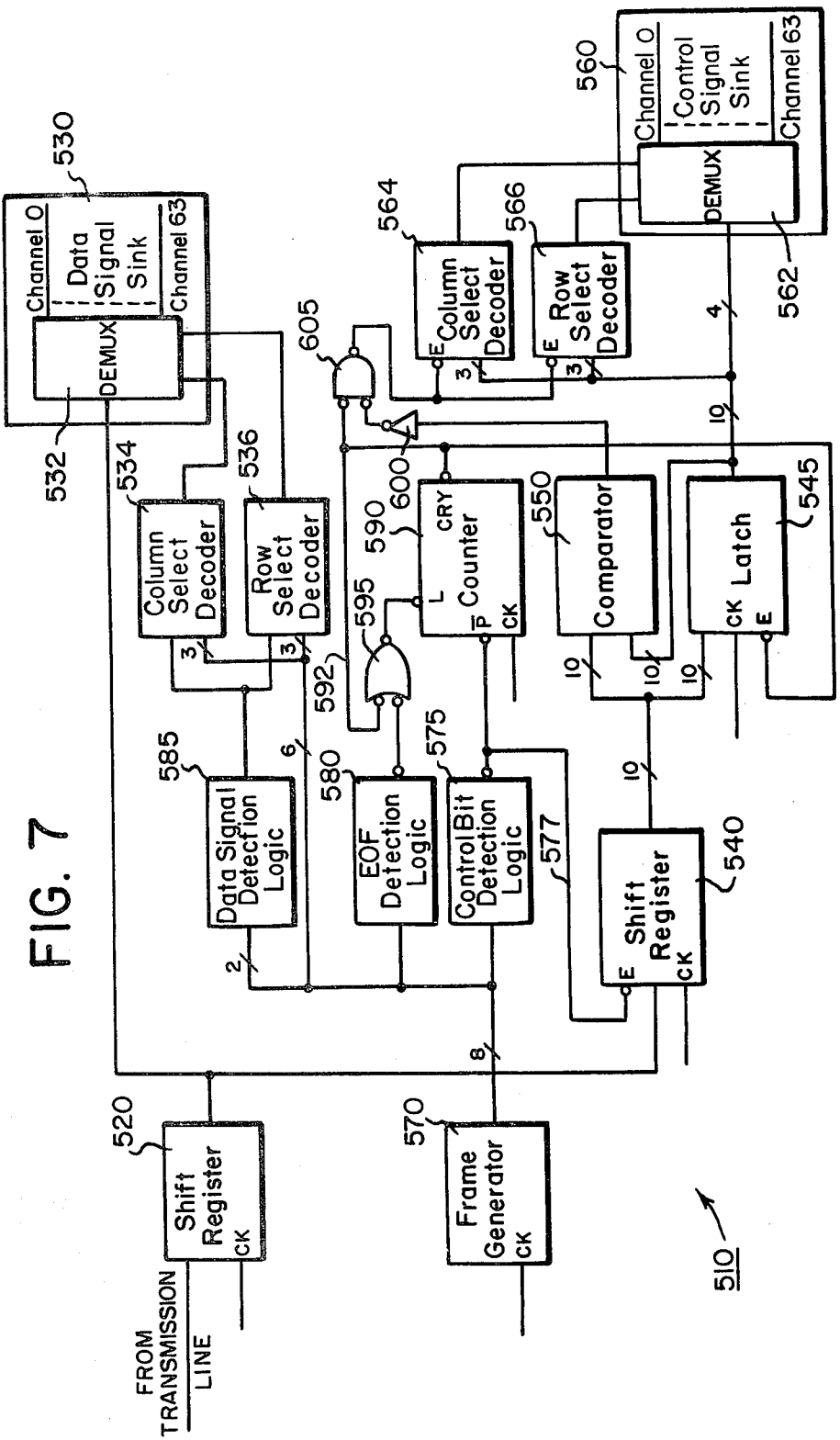
FIG. 7 is a block diagram of an illustrative embodiment of a TDM receiver for receiving signals transmitted by the apparatus of FIG. 2.

FIG. 7 depicts an illustrative TDM receiver 510 for processing the signals received from a transmitter such as that of FIG. 2. As will be apparent, this receiver is synchronous with the transmitter with which it is in communication. Under control of clock signals derived from the received signals, the receiver separates the control signals from the data signals as they are received on a bit-by-bit basis, reassembles the control signals, and routes the data signals and the control signals to their appropriate channels. Apparatus 510 comprises a first shift register 520, a data signal sink 530, data signal column select and row select decoders 534, 536, a second shift register 540, a latch 545, a comparator 550, a control signal sink 560, and control signal column select and row select decoders 564, 566. The apparatus further comprises a frame generator 570, control bit detection logic 575, end-of-frame (EOF) detection logic 580, data signal detection logic 585, a counter 590 and an AND gate 595 which function in similar fashion to frame generator 130, control bit detection logic 210, EOF detection logic 215, counter 220 and AND gate 240 of FIG. 5. Counter 590 reaches zero on every tenth count producing an output on line 592 which enables latch 545 and reloads the counter. The apparatus also comprises an inverter 600 and an OR gate 605, which enable decoders 564, 566 on every twentieth count if the contents of latch 545 and comparator 550 are the same. To simplify the description, numerous other elements of a TDM receiver which are not part of this invention are not described.

Consistent with the apparatus shown in FIG. 2, the apparatus of FIG. 7 is large enough to accommodate up to 64 separate data channels; and the modification of this apparatus to accommodate other numbers of channels will be obvious. To avoid unnecessary detail, FIG. 7 does not depict numerous elements of a TDM receiver which are not part of this invention.

Frame generator 570 is substantially the same as frame generator 130 of FIG. 2 and produces the exact same sequence of output signals, some of which are used to route received signals to the data channels and others of which are used for routing of control and/or synchronization signals.

Data signal sink 530 comprises the 64 individual channels that are served by the TDM and a demultiplexer 532 which routes a bit of received data to an individual channel in accordance with the channel select signal supplied from frame generator 570. Further details of an illustrative demultiplexer 532 are disclosed in U.S. Pat. No. 3,632,882. When data signal detection logic 585 detects a data channel select signal in the output signal from frame generator 570, it enables column select and row select decoders 534, 536 to decode the address in the channel select signal. As will be apparent, the output of decoders 534, 536 controls an array of channel select gates such as gates 300A-300X and 301A-301X of the demultiplexer of the '882 patent.

Control signal sink 560 comprises the individual channels that are served by TDM and a demultiplexer 562 which routes a control signal to an individual channel in accordance with the address supplied from column select and row select decoders 564, 566. Again the demultiplexer may be similar to that described in U.S. Pat. No. 3,632,882.

When a CONTROL select signal is generated by frame generator 570, this signal is detected by control bit detection logic 575 which causes the signal on line 577 to go low. This signal enables counter 590 and shift register 540; and when the next clock signal is received, one bit of data is shifted into shift register 540 and counter 590 is decremented by one. As noted above, each control signal consists of ten bits and it is transmitted twice to ensure accuracy of transmission. Thus, ten bits must be shifted into register 540 to assemble a complete control signal therein; and two complete control signals are shifted through the register, one immediately after the other.

When counter 590 reaches zero, the low signal on line 592 reloads the counter through AND gate 595 and also enables latch 545. When latch 545 is enabled, the contents of shift register 540 are stored therein upon receipt of the next clock signal. The contents of latch 545 are constantly compared by comparator 550 with the contents of shift register 540. On the tenth count after the contents of shift register 540 are stored in latch 545, counter 590 again reaches zero and the signal on line 592 goes low. At the same time, the contents of shift register 540 should represent the second transmission of the control signal stored in latch 545. If this is the case, the output of comparator 550 goes high. This signal is inverted by inverter 600 and applied to OR gate 605 along with the signal on line 592. Since both signals are low, column select and row select decoders 564, 566 are enabled and the address portion of the control signal stored in latch 545 is decoded by these decoders. The signal on the remaining four lines from latch 545 is the control signal which is routed by multiplexer 562 to the channel specified by the column select and row select decoders 564, 566.

As will be apparent to those skilled in the art, the invention may be practiced in numerous forms. Typically a transmitter such as shown in FIGS. 2A and 2B and a receiver such as shown in FIG. 7 are located at each station in a TDM communication system but transmit only or receive only stations may be used. Different techniques may be devised for interleaving the polled control signals with the updated control signals; and different ways for implementing such techniques, both in hardware and in software, will be apparent to those skilled in the art. Although the apparatus described provides for bit interleaving of the signals from the different channels, appropriate modification of the apparatus to provide for character interleaving or the interleaving of other size blocks of data will be apparent to those skilled in the art. While the transmission of a polled control signal once in every eight transmissions of a control signal appears to be a reasonable compromise between the need to transmit updated control signals and the need to transmit polled control signals, the invention may be practiced using any ratio of polled signals to control signals. Numerous other variations in the practice of the invention will be apparent.

What is claimed is:

1. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, a method of transmitting the control signals comprising the steps of:
   monitoring the channels for a change in the control signals associated with a channel,
   when a control signal changes, transmitting the changed control signal in at least one time slot in the second set of time slots,
   counting the number of changed control signals that are transmitted,
   after a specified number of changed control signals are transmitted, transmitting at least one of the control signals associated with one of said channels without regard to whether there has been any change in the control signals associated with said one of said channels,
   repeating the steps of monitoring the channels, transmitting the changed control signal and counting the number of changed control signals that are transmitted, and
   after a specified number of changed control signals are transmitted, transmitting at least one of the control signals associated with a different one of said channels without regard to whether there has been any change in the control signals associated with said different one of said channels.

2. The method of claim 1 further comprising the step of transmitting each control signal twice.

3. The method of claim 1 wherein the steps of transmitting the control signals associated with said channels without regard to whether there has been any change in the control signals comprises the step of using a counter to poll the channels, said counter being advanced for each transmission of the control signals from a channel polled by said counter.

4. The method of claim 1 further comprising the steps of storing the control signals and their associated channel address before transmission and protecting any changed control signals so stored from being overwritten.

5. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, a method of transmitting the control signals comprising the steps of:
   monitoring the channels to determine if there has been a change in the control signals associated with a channel,
   upon detection of a change, storing the control signals for that channel as well as the channel address so as to prevent the loss of said signals,
   transmitting said stored signals in the second time slots in the transmission stream,
   counting the nunber of changed signals that are transmitted,
   after a specified number of changed control signals are transmitted, addressing a channel without regard to whether there has been any change in its control signals and storing the control signals associated with said channel as well as its channel address,
   transmitting the control signals and their channel address so stored in the second set of time slots in the transmission stream,
   repeating the steps of monitoring the channels, storing the control signals, transmitting the stored signals and counting the number of changed signals that are transmitted,
   after a specified number of changed control signals are transmitted, addressing another channel without regard to whether there has been any change in its control signals and storing the control signals associated with said channel as well as its address, and
   transmitting the control signals and their channel address so stored in the second set of time slots in the transmission stream.

6. The method of claim 5 wherein a counter is used to select the channels whose signals are stored without regard to whether there has been any change in the control signal, said counter being advanced for each transmission of the control signals from a channel polled by the counter.

7. The method of claim 1 or claim 6 wherein signals from the different channels are interleaved in the transmission stream on a bit-by-bit basis.

8. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, apparatus for transmitting the control signals comprising:
   means for monitoring the channels for a change in the control signals associated with a channel, means for transmitting a changed control signal in at least one time slot in the second set of time slots, means for counting the number of changed control signals that are transmitted, and means for transmitting the control signals associated with a channel without regard to whether there has been any change in said control signals after a specified number of changed control signals are transmitted, said means being operative to transmit the control signals from different channels at different times so that each channel in the plurality of channels is polled over a period of time.

9. The apparatus of claim 8 wherein said monitoring means comprises means for detecting a request for service from said channels, means for successively addressing each channel, and means for detecting a response from the addressed channel which requested service.

10. The apparatus of claim 9 wherein said means for successively addressing each channel is a counter.

11. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, apparatus for controlling the transmission of said control signals comprising:

means for signaling when a control signal on a channel has changed, means for accessing the control signals of the channel where a control signal has changed, and means for transmitting control signals and the address associated with said channel in said second time slots, characterized by:

means for counting the number of times the transmitted control signals are signals which have changed, means for accessing the control signals of channels without regard to whether its control signals have changed, said means being operative to access the control signals of different channels at different times so that each channel in the plurality of channels is polled over a period of time, and means for interleaving in the second time slots in the transmission stream control signals obtained from a channel without regard to whether its control signals have changed, said signals being interleaved after a specified number of changed control signals have been transmitted.

12. The apparatus of claim 8 or claim 11 further comprising means for storing the control signals for a channel as well as the address of said channel, said means storing both control signals which have changed and those which have been accessed without regard to whether they have changed, an output of said storing means being connected to said transmitting means.

13. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, apparatus for transmitting the control signals comprising:

means for monitoring the channels to determine if there has been a change in the control signals associated with a channel, means for storing the control signals as well as the channel address for that channel, means for transferring to said storing means the control signals and channel address for a channel where there has been a change in the control signals, means for transmitting said stored control signals and their associated channel address in the second time slots in the transmission stream, means for counting the number of changed signals that are transmitted, and means for successively addressing the channels, after specified numbers of changed control signals are transmitted, without regard to whether there has been any change in the control signals and for storing the control signals of said channels and their channel addresses in said storing means from which said control signals and their channel address are transmitted in the second time slots in the transmission stream.

14. The apparatus of claim 11 or claim 13 wherein the means for successively addressing the channels after specified numbers of changed control signals are transmitted comprises a counter which is advanced for each transmission of control signals obtained from a channel without regard to whether the control signals had changed.

15. In a time division multiplexer system for multiplexing data and control signals from a plurality of channels so as to produce a single stream of signals on a transmission line and for demultiplexing said stream of signals from said transmission line to produce data and control signals on a plurality of channels, said stream having a first set of time slots allocated to the transmission of data signals and a second set of time slots allocated to the transmission of control signals, apparatus for transmitting the control signals comprising:

means for monitoring the channels to determine if there has been a change in the control signals associated with a channel, means for storing the control signals as well as the channel address for that channel, means for transferring to said storing means the control signals and channel address for a channel where there has been a change in the control signals, means for transmitting said stored control signals and their associated channel address in the second time slots in the transmission stream, means for counting the number of changed signals that are transmitted, and means for successively addressing the channels, after specified numbers of changed control signals are transmitted, without regard to whether there has been any change in the control signals and for storing the control signals of said channels and their channel addresses in said storing means from which said control signals and their channel address are transmitted in the second time slots in the transmission stream, and apparatus for receiving the control signals comprising:

means for storing the control signals and their channel address;

means for using the stored channel address to address the channel so identified, whereby the stored control signals are made available to the addressed channel.

16. The apparatus of claim 15 wherein the means for successively addressing the channels after specified numbers of changed control signals are transmitted comprises a counter which is advanced for each transmission of control signals obtained from a channel without regard to whether the control signals had changed.

17. The apparatus of claim 15 wherein the control signals and their associated channel address are transmitted twice and said receiving apparatus further comprises:
   means for storing both sets of control signals and their associated channel address as received by said receiving apparatus, and
   means for testing said two sets of received signals for identity prior to using the stored address to make the stored control signal available to the addressed channel.

18. The apparatus of any one of claims 8, 11, 13 and 15 wherein the signals from the different channels are interleaved in the transmission stream on a bit-by-bit basis.

19. In a time division multiplexer for multiplexing data and control signals from a plurality of channels so as to produce a single stream of signals on a transmission line, said stream having a first set of time slots allocated to the transmission of data signals and a second set of time slots allocated to the transmission of control signals, apparatus for transmitting the control signals comprising:
   means for monitoring the channels to determine if there has been a change in the control signals associated with a channel,
   means for storing the control signals as well as the channel address for that channel,
   first means responsive to said monitoring means for successively addressing the channels to locate a channel where there has been a change in the control signals associated with that channel and for transferring said control signals and channel address to said storing means,
   means for transmitting said stored control signals and their associated channel address in the second time slots in the transmission stream,
   means for counting the number of changed signals that are transmitted, and
   second means for successively addressing the channels, after specified numbers of changed control signals are transmitted, without regard to whether there has been any change in the control signals and for transferring the control signals of said channels and their channel addresses to said storing means from which said control signals and their channel address are transmitted in the second time slots in the transmission stream.

20. The apparatus of claim 19 wherein the means for successively addressing the channels after specified numbers of changed control signals are transmitted comprises a counter which is advanced for each transmission of control signals obtained from a channel without regard to whether the control signals had changed.

* * * * *